United States Patent [19]

Freeman et al.

[11] Patent Number: 5,238,742
[45] Date of Patent: Aug. 24, 1993

[54] POLYMER DERIVED CERAMIC FIBERS HAVING IMPROVED THERMAL STABILITY

[75] Inventors: Harvey A. Freeman, Sanford; Neal R. Langley, Midland; Chi-Tang Li, Midland; Jonathan Lipowitz, Midland; James A. Rabe, Midland, all of Mich.

[73] Assignee: Dow Corning Corporation, Midland, Mich.

[21] Appl. No.: 808,301

[22] Filed: Dec. 16, 1991

Related U.S. Application Data

[63] Continuation of Ser. No. 464,824, Jan. 16, 1990, abandoned.

[51] Int. Cl.[5] .......................... C01B 31/36; C07F 7/08
[52] U.S. Cl. ...................................... 428/367; 428/364; 501/32; 501/35; 501/56; 501/95; 501/97; 264/22; 264/65; 264/DIG. 19
[58] Field of Search .................. 428/364, 367; 501/35, 501/32, 56, 97, 95; 423/345; 264/22, 65, DIG. 19

[56] References Cited

U.S. PATENT DOCUMENTS 4,283,376  8/1981  Yajima et al. ........................ 423/345

*Primary Examiner*—Patrick J. Ryan
*Assistant Examiner*—Richard C. Weisberger
*Attorney, Agent, or Firm*—Roger E. Gobrogge

[57] ABSTRACT

The present invention relates to ceramic fibers of the Si-C-N-O series with a diameter less than about 20 micrometers. It has been unexpectedly found that the thermal stability of these fibers can be increased by minimizing the impurity content, primarily the content of metals or metallic compounds. Such fibers with low levels of contaminants retain greater than about 60 percent of their initial tensile strength when subjected to temperatures of 1300°–1400° C. for at least 30 minutes in a non-oxidative environment.

6 Claims, No Drawings

POLYMER DERIVED CERAMIC FIBERS HAVING IMPROVED THERMAL STABILITY

This is a continuation of copending application Ser. No. 07/464,824 filed on Jan. 16, 1990, now abandoned.

FIELD OF INVENTION

The present invention relates to ceramic fibers of the Si-C-N-O series which retain their room temperature tensile strength after being subjected to elevated temperatures.

BACKGROUND OF THE INVENTION

Ceramic fibers prepared from various organosilicon polymers are well known in the art. These fibers have a broad array of utilities such as reinforcement for plastic, ceramic and metal matrices to produce high performance composite materials or the formation of fibrous products such as high temperature insulation, belting, gaskets and curtains.

Unfortunately, the room temperature tensile strength of these fibers diminishes rapidly after being exposed to temperatures of 1200° C. and higher for longer than 30 minutes. End products produced from these fibers, therefore, are also expected to have only marginal service life in this environment.

Early explanations for the decreased tensile strength after high temperature aging primarily centered around the evolution of gaseous species. Mah et al., for instance, in J. Mat. Sci. 19 (1984) 1191–1201 described the degradation behavior of Nicalon ™ (Si-C-O fibers, Nippon Carbon Co.) fibers after heat treatment. They discovered that fiber strength degraded at temperatures in excess of 1200° C. regardless of heat treatment conditions. They also discovered that degradation was often associated with evaporation of CO as well as beta-SiC grain growth. No solutions to this problem were suggested.

Luthra in J. Am. Ceram. Soc., 69 (10) c-231-233 (1986) examined the inherent instability of Si-C-N-O series ceramic fibers at elevated temperatures (Above 1000° C.) and concluded that the fiber composition is expected to change (by gas evolution), irrespective of the environment used for pyrolysis. The possible solutions suggested therein to overcome the above problems included eliminating oxygen and nitrogen from the polymer or replacing the free carbon in the ceramic with free silicon.

Lipowitz et al. in Advanced Ceramic Materials, Vol. 2, No. 2, 121 (1987), which is incorporated herein in its entirety, describes the composition and structure of 4 melt spun Si-C-N-O series fibers including standard grade Nicalon ™, ceramic grade Nicalon ™, fibers derived from methylpolydisilylazane and fibers derived from hydridopolysilazane. It is disclosed therein that temperatures at or above 1300° C. cause degradation of these fibers through the loss of gases such as CO, SiO and $N_2$ and through the formation of coarse beta SiC grains.

Johnson et al. in J. Am. Ceram. Soc., 71 (3) C-132-C-135 (1988) discuss the thermal degradation mechanisms of Nicalon ™ and a silicon carbide fiber deposited by chemical vapor deposition (CVD). They suggest therein that the loss in strength of CVD fibers is largely a result of the loss of CO whereas the loss in strength of Nicalon ™ fiber results from the loss of structurally bound Si as SiO. The authors disclose that the localization of calcium on the surface of CVD fibers may be potentially deleterious in terms of fiber degradation but that it is not known whether the transport of calcium to the surface of other types of SiC fibers significantly affects their strength. This reference, therefore, does not disclose the effect of metal or metal compound impurities on polymer-derived ceramic fibers.

The present applicants have now discovered that heterogenously distributed impurities such as metals or metallic compounds cause the high temperature instability observed in polymer derived ceramic fibers of the Si-C-N-O series. Moreover, removal of said impurities has led to products with unique high temperature stability and, thus, will extend high temperature service life of composites made therefrom.

SUMMARY OF THE INVENTION

The present invention relates to polymer-derived ceramic fibers of the Si-C-N-O series with a diameter less than about 20 micrometers. It has been unexpectedly found that the thermal stability of these fibers can be increased by minimizing the impurity content, primarily the content of heterogenously distributed metals or metallic compounds. Such fibers with low levels of contaminants retain greater than about 60 percent of their initial tensile strength after being subjected to temperatures of 1300°–1400° C. for at least 30 minutes in argon, nitrogen or a similar non-oxidative environment.

Decreased contaminant levels have been achieved by a series of incremental process changes aimed at removing metallic and metal compound impurities (i.e. filtration), reducing further incorporation of such impurities by eliminating metallic process equipment and avoiding environmental contamination in all aspects of the process.

DETAILED DESCRIPTION

The present applicants have discovered that polymer-derived ceramic fibers with low levels of impurities retain their room temperature tensile strength after being subjected to high temperatures. Specifically, said fibers can retain greater than about 60% of their original room temperature tensile strength after being heated to temperatures of 1300°–1400° C. for at least 30 minutes in argon, nitrogen or a similar non-oxidative environment.

As used herein, the expressions "high temperature stability" and "retained tensile strength" are meant to indicate that the fibers have the same or similar room temperature tensile strength before and after high temperature aging. "High temperature aging" designates heating to temperatures of about 1300°–1400° C. for at least about 30 minutes in argon, nitrogen or a similar non-oxidative environment.

The ceramic fibers of the invention are of the series Si-C-N-O. This series designator is used to describe compositions having a partially amorphous chemical structure consisting of various combinations of carbon, nitrogen and/or oxygen randomly bonded to the silicon atoms. These fibers are prepared by pyrolysis of melt-spun, cured organosilicon polymers. Examples of these fibers are Si-C-O fibers derived from polycarbosilane or methylpolysilane polymers, Si-C-N-O fibers derived from methylpolydisilylazane (MPDZ) polymers and Si-C-N-O fibers derived from hydridopolysilazane (HPZ) polymers. Despite these examples, it is within the scope of this invention to utilize any fiber of the Si-C-N-O series. Particularly advantageous, however, are those fibers in which the oxygen content is minimized.

The above fibers generally have diameters in the range of 5-25 micrometers. They have tensile strength in the range of about 2-3 GPa and modulus about 150-250 GPa. They exhibit glassy brittle tensile fracture showing a fracture mirror surrounded by a mist region and hackle lines.

As disclosed in the prior art, these fibers are known to have poor high temperature stability. In other words, the tensile strength, as measured at room temperature, is substantially lower after high temperature aging of the fibers than the tensile strength of the same fibers as measured at room temperature prior to the high temperature aging. Generally, for instance, these prior art fibers retained less than about 50% of their original tensile strength. This art exemplifies the numerous theories as to why fibers of the Si-C-N-O series lose their tensile strength when heated to elevated temperatures along with the various attempts to solve this problem. The present applicants have found that upon heating to temperatures of 1300°-1400° C. in argon, nitrogen or a similar non-oxidative environment for greater than about 30 minutes fiber tensile strength decreases rapidly before bulk changes in crystallization, gas evolution or bulk decomposition are seen. The inventors believe the tensile strength loss is explained by a novel model of flaw growth due to local decomposition reactions at flaw surfaces. These decomposition reactions are catalyzed by trace levels of heterogenously distributed impurities such as metals or metallic compounds and result in immeasurably small changes in bulk composition or structure.

The inventors have made the following observations which are consistent with the above model:

1) The inventors have detected metallic impurities in the polymer, cured fiber and the pyrolyzed fiber. Additionally, metallic impurities are often detectable at the site of fiber fractures after high temperature aging. Microanalysis, finally, has shown that even when total fiber impurity levels are relatively low, the impurities may be concentrated in the area of flaw sites.

2) Certain metallic compounds produce crystalline SiC and $Si_3N_4$ when added to Si-C-N-O series ceramics and heated above 1000° C. See Baney "Ultrastructure Processing of Ceramics, Glasses and Composites", Chapter 20 pp 248-249, L. L. Hench and D. R. Ulrich Ed., J. Wiley, New York (1984).

3) Several transition and noble metals form low temperature melting eutectic mixtures with Si which catalyze SiC whisker growth. See Bracke et al., "Inorganic Fibers and Composite Materials", Pergamon Press, Oxford, U.K. 69-71, (1984), Siddiqi et al., J. Mat. Sci., 20, 3230-3238 (1985) and Messier et al., "Preparation and Properties of Solid State Materials", 7, W. R. Wilcox Ed., Marcel Decker, New York, 131-212 (1982).

The fibers of the invention are, therefore, of the same macrostructure as the above described prior art fibers. On a microscale, however, the level of impurities in these fibers is sufficiently low to substantially reduce or eliminate flaw catalysis and, thus, provide a unique fiber which is characterized by a degree of high temperature stability which has not previously been obtainable. Generally, the impurity level is less than 10 ppm for any single metal with levels of less than 1 ppm being more preferred. Even lower impurity levels may be necessary if the distribution of impurities is highly heterogenous.

To provide fibers of the above purity, the applicants proposed a concentrated effort to eliminate all sources of contamination during the precursor polymer synthesis and fiber making process. Generally, this involved the use of pure filtered reactants and gases, filtration of the product at various stages of the process, the use of non-metallic equipment, and the avoidance of environmental contamination. The inventors also believe, however, that other measures which inhibit the introduction of contaminants would also be beneficial. By such incremental process changes, the applicants sequentially eliminated many sources of contamination. The new process, which resulted from the incremental changes, yields fibers with improved high temperature strength retention.

A typical fiber production process includes the steps of synthesizing the polymer and then spinning, curing and pyrolyzing the fiber. Numerous methods of eliminating contamination in this type of process are possible. During polymerization, (1) filtration of reactants, solvents and gases will control the initial introduction of impurities; (2) working in a clean environment, avoiding open systems and using direct transfers can minimize environmental contamination; (3) the use of non-metallic equipment such as reaction chambers and transfer devices can avoid the introduction of metallic impurities during various steps of the process; and (4) filtration of the polymer between various steps of the polymerization process will remove any incidental contaminants and prevent gel formation. During the spinning process, (1) direct transfer of the polymer into the spinning unit will avoid environmental contamination; (2) filtration of the molten polymer prior to spinning will eliminate any incidental contamination; and (3) the use of non-metallic spinning and fiber take-up equipment will prevent additional metallic contamination. During the cure process, (1) the use of pure curing agents will control direct impurity introduction; and (2) curing in a clean, closed, non-metallic environment will aid in eliminating any incidental contamination. During pyrolysis, (1) filtration of the gases used to create the pyrolysis environment will inhibit direct contamination of the fiber; and (2) a closed, direct transfer of the cured fiber to the pyrolysis area as well as the use of a clean, non-metallic furnace will minimize environmental contamination.

In a preferred embodiment of the invention, hydridopolysilazane (HPZ) ceramic fibers, as disclosed in U.S. Pat. No. 4,540,803 or Ceramic Bulletin, Vol. 66, No. 2 p363-367 (1987), which are both incorporated herein in their entirety, are made in a highly purified form to produce fibers with high temperature stability.

The formation of HPZ polymer comprises reacting trichlorosilane, hexamethyldisilazane and a solvent by stirring in an inert, essentially anhydrous environment. After an initial exotherm, the mixture is heated to remove volatile byproducts, oligomers and the solvent. The product is cooled to ambient temperature yielding a clear, colorless solid.

The solid polymer is placed in a melt chamber which liquifies the polymer. The liquid polymer thereby produced is extruded through a spinnerette and cooled by a stream of nitrogen gas as the fiber is expelled. The cooled polymer fiber is treated with cure gases and pyrolyzed in a furnace under an inert atmosphere at a rate of about 3° C./minute up to about 1200° C., yielding the HPZ ceramic fiber.

Numerous steps were taken to eliminate impurities in the above process. In the polymerization process:

(1) a redistilled grade of hexamethyldisilazane, a semiconductor grade of trichlorosilane and high purity solvents are utilized;

(2) the initial premix formed when the above reactants are brought together are filtered through a 0.2 micrometer filter prior to introduction into the polymerization reactor;

(3) the gases used to create the inert environment for polymerization, curing and pyrolysis were filtered through a 0.2 micrometer filter prior to introduction into the system;

(4) the use of a filter aid to remove gels formed in the polymerization reactor is obviated by using purified reactants. Hence, the introduction of contaminants via the filter aid is eliminated;

(5) paddle stirrers used in the various reactions are adjusted to eliminate metal to metal contact;

(6) diaphragm pumps replace gear pumps which add additional metallic contamination;

(7) open transfer of reagents and products are eliminated to avoid environmental contamination;

(8) the final polymeric product is filtered through a 0.02 micrometer filter prior to spinning; and (9) the final product is directly evaporated into the spinning container without stripping.

In the spin/cure process:

(1) the polymer is filtered through a 0.5 micrometer filter prior to spinning;

(2) distilled water replaces tap water as a curing agent; and (3) non-stainless steel in the spinnerette is replaced by stainless steel.

In the pyrolysis process:

(1) the pyrolysis furnace is clean and non-metallic.

Though the above steps are specific with respect to the fiber being formed, many of these techniques may be utilized in other fiber polymerization/cure/pyrolysis procedures. The key element in production appears to be limiting the introduction of contaminants to a level such that even an accumulation of said contaminants in a portion of the fiber will not dramatically affect the fibers high temperature stability.

The following non-limiting examples are provided so that one skilled in the art might better understand the invention.

EXAMPLE 1

In order to determine the sources of contamination, a thorough analysis of the hydridopolysilazane (HPZ) ceramic fiber production processes was undertaken. X-ray fluorescence was used to analyze trace elemental content of uncured fiber, on-line cured fiber which was post cured under vacuum and pyrolyzed fiber. A sample of SiC powder from Cerac with low iron content was also analyzed as received, after exposure to the above curing/post curing conditions and after exposure to the firing conditions. The following table represents the results:

| MATERIAL | IMPURITY (ppm) | |
| --- | --- | --- |
| HPZ spun fiber | Fe < 7 | Cl < 20 |
| HPZ spun fiber, cured and post cured | Fe 35 ± 8 | Cl 8400 |
| HPZ spun fiber, cured, post cured and pyrolyzed | Fe 29 ± 8 | Cl 1000 ± 100 |
| SiC powder as received | Fe 25 ± 8 | Cl 50 ± 5 |
| SiC powder ground | Fe 29 ± 8 | Cl 40 ± 4 |
| SiC powder cured and post cured | Fe 90 ± 8 | Cl 200 ± 20 |
| SiC powder pyrolyzed | Fe 31 ± 8 | Cl 50 ± 8 |

As is evident from the above table, the large increase in iron and chlorine content after curing with no further increase upon pyrolysis indicates that a majority of the contamination was introduced during curing/post curing. Examination of the curing process revealed corrosion of steel parts in the curing oven and a concentration of 19 micrograms Fe per L of HCl cure gas.

To eliminate this contamination, several changes were made in the process; the steel vacuum oven used to post cure fibers was replaced with a quartz tube with TEFLON TM tubing, a glass flow meter replaced one with metal parts and the HCl curing gas was replaced by a purer grade with only 0.29 micrograms Fe per L. Ceramic fibers produced under these conditions were aged for 2 hours at 1400° C. in argon. They exhibited exceptional retention of tensile strength—58% (initial 2450±540 MPa; aged 1420±980 MPa) compared to significantly less than 50% when produced under the old conditions.

EXAMPLE 2

This experiment was performed to determine if a cured fiber which was intentionally contaminated would exhibit thermal stability problems. One end of a cured fiber bundle was touched lightly with a fingertip contaminated with the rust from a gas cylinder chain. The opposite end was left clean. The bundle was pyrolyzed to 1200° C. at 3° C./minute in nitrogen. The sample aged for 2 hours at 1400° C. in argon.

A scanning electron microscope examination showed the clean filaments retained a pristine appearance while filaments from the contaminated end were covered with pits, crystal growth and degrading surface layers.

This exaggerated example shows that environmental contaminants have an impact on fiber stability.

EXAMPLE 3

A chronological sequence of strength retention results after aging 2 hours at 1400° C. in an argon environment is shown in the following table. The first set of data represents typical ceramic grade Nicalon TM fiber behavior for reference. The second set of data represents HPZ fiber lots prior to the institution of the new 'clean' process. Most of the process changes designed to remove metallic contamination were made just prior to production of polymer lot 15 and were maintained through lot 28.

Fiber produced in lots 15, 19, 24, 27 and 28 are representative of the unique new fibers of this invention. Fibers produced in lots 23 and 25 did not exhibit the stability to high temperature aging which characterizes fibers of this invention. It is believed that inadvertent contamination may have occurred during production of these fibers.

| MATERIAL | INITIAL STRENGTH (KSI) | AGED STRENGTH (KSI) | PERCENT RETENTION |
| --- | --- | --- | --- |
| NICALON 1 | 397 | 53 | 13 |
| NICALON 2 | 397 | 58 | 15 |
| NICALON 3 | 397 | 0 | 0 |

-continued

| MATERIAL | INITIAL STRENGTH (KSI) | AGED STRENGTH (KSI) | PERCENT RETENTION |
|---|---|---|---|
| NICALON 4 | 397 | 99 | 25 |
| NICALON 5 | 397 | 0 | 0 |
| EARLY HPZ 1 | 138 | 146 | 106 |
| EARLY HPZ 2* | 355 | 206 | 58 |
| EARLY HPZ 3 | 421 | 107 | 25 |
| EARLY HPZ 4 | 287 | 116 | 40 |
| EARLY HPZ 5 | 253 | 82 | 32 |
| EARLY HPZ 6 | 286 | 98 | 34 |
| EARLY HPZ 7 | 287 | 81 | 28 |
| HPZ LOT 15 | 280 | 185 | 66 |
| HPZ LOT 19 | 304 | 316 | 104 |
| HPZ LOT 19 | 304 | 389 | 130 |
| HPZ LOT 19 | 384 | 348 | 91 |
| HPZ LOT 19 | 384 | 114 | 30 |
| HPZ LOT 23 | 322 | 109 | 34 |
| HPZ LOT 24 | 349 | 295 | 85 |
| HPZ LOT 24 | 386 | 215 | 56 |
| HPZ LOT 24 | 377 | 244 | 65 |
| HPZ LOT 24 | 604 | 227 | 38 |
| HPZ LOT 25 | 476 | 104 | 22 |
| HPZ LOT 27 | 433 | 310 | 72 |
| HPZ LOT 27 | 377 | 230 | 61 |
| HPZ LOT 28 | 299 | 310 | 104 |
| HPZ LOT 28 | 282 | 318 | 113 |

*This sample was produced in the lab where it received special processing such as additional filtration.

What is claimed is:

1. A polymer-derived ceramic fiber of the Si-C-N-O series with a diameter less than about 20 micrometers which has increased thermal stability such that it retains greater than about 60 percent of its initial room temperature tensile strength after being subjected to temperatures of 1300°-1400° C. for at least 30 minutes in argon, nitrogen or a non-oxidative atmosphere, wherein said fiber contains less than 10 ppm of any single metal.

2. The ceramic fiber of claim 1 wherein the initial tensile strength is greater than about 2000 MPa and modulus greater than about 200 GPa.

3. The ceramic fiber of claim 1 wherein the fiber is derived from hydridopolysilazane.

4. The ceramic fiber of claim 1 selected from the group consisting of Si-C-O fibers derived from polycarbosilane polymers, Si-C-O fibers derived from methylpolysilane polymers and Si-C-N-O fibers derived from methylpolydisilylazane polymers.

5. The ceramic fiber of claim 1 which contains less than 1 ppm of any single metal.

6. Hydridopolysilazane fibers with diameter less than about 20 micrometers having tensile strength above 1500 MPa after being subjected to temperatures of 1200°-1400° C. for at least 30 minutes, wherein said fibers contain less than 10 ppm of any single metal.

* * * * *